(12) United States Patent
Cunningham (10) Patent No.: US 8,079,633 B2
(45) Date of Patent: Dec. 20, 2011

(54) CABIN

(75) Inventor: Raymond Bruce Cunningham, Sydney (AU)

(73) Assignee: Paul Michael Freeman & Phillip Graeme Fisher, New South Wales (AU)

( * ) Notice: Subject to any disclaimer, the term of this patent is extended or adjusted under 35 U.S.C. 154(b) by 0 days.

(21) Appl. No.: 12/871,580

(22) Filed: Aug. 30, 2010

(65) Prior Publication Data

US 2011/0057475 A1    Mar. 10, 2011

Related U.S. Application Data

(60) Provisional application No. 61/240,042, filed on Sep. 4, 2009.

(51) Int. Cl.
*B60P 3/34* (2006.01)
*B60P 3/363* (2006.01)

(52) U.S. Cl. ..... 296/158; 296/165; 296/174; 296/26.15; 296/61

(58) Field of Classification Search .......... 296/158, 296/165, 26.15, 174, 61; 414/537
See application file for complete search history.

(56) References Cited

U.S. PATENT DOCUMENTS

| | | | | |
|---|---|---|---|---|
| 1,644,892 A * | 10/1927 | Noble | | 296/174 |
| 2,484,312 A * | 10/1949 | Rebours | | 296/172 |
| 3,469,356 A * | 9/1969 | White | | 52/71 |
| 3,598,441 A * | 8/1971 | Damiani | | 296/164 |
| 3,812,988 A | 5/1974 | Pyle | | 214/505 |
| 3,961,716 A * | 6/1976 | Renaud | | 414/537 |
| 5,137,413 A | 8/1992 | Ressler | | 414/474 |
| 5,314,200 A * | 5/1994 | Phillips | | 280/400 |
| 6,270,137 B1 * | 8/2001 | Minix et al. | | 296/24.3 |
| 6,722,726 B1 | 4/2004 | Parmer | | 296/157 |
| 2003/0099532 A1 * | 5/2003 | Williams | | 414/538 |
| 2004/0239135 A1 | 12/2004 | Mehrer | | 296/26.13 |
| 2008/0142059 A1 | 6/2008 | Bonebrake | | 135/88.1 |

FOREIGN PATENT DOCUMENTS

| | | |
|---|---|---|
| DE | 102008024169 | 11/2009 |
| FR | 596528 | 4/1925 |
| FR | 2617449 | 1/1989 |
| GB | 596528 | 7/1945 |
| GB | 2145379 | 3/1985 |
| GB | 2416116 | 1/2006 |

* cited by examiner

*Primary Examiner* — Dennis Pedder
(74) *Attorney, Agent, or Firm* — Seed IP Law Group PLLC (57) ABSTRACT

A cabin of a mobile home or other transport vehicle is provided with an internal living space adapted to minimize the space of furniture and beds during transport such that a small automobile may be received within the living space. In a set-up configuration and the automobile removed, beds can be deployed externally to the living space by a system of hinged panels attached to the side of the cabin. Furniture may also be rearranged within the interior of the cabin or mobile home on floor tracks.

14 Claims, 9 Drawing Sheets

CABIN

BACKGROUND

1. Technical Field

This disclosure generally relates to a cabin with a living space that is configurable to maximize the use of the living space.

2. Description of the Related Art

A cabin used as part of a motor home, caravan or other mobile transport vehicle will often have limited internal living space. Accordingly, it is desirable to be able to reconfigure the interior living space depending on the use. One such limitation on the internal space is due to a maximum allowable width of the cabin when used on the road. In particular, it is desirable to be able to expand the width of the internal living space when the vehicle is at the campsite and narrow the cabin in preparation for transit on the road.

Providing bedding takes up a considerable amount of floor space in a cabin. Bedding in known motor home cabins is often provided above the drive cabin or toward the rear of the cabin. This restricts the head room available either in the driver cab or toward to driver cab end of the cabin or where the bedding is in the rear of cabin restricts the available floor space.

When the cabin is used as part of a motor home, it is often desirable to go for a drive away from the campsite to go, for example, sightseeing. This requires packing up the motor home and taking, what is often a large vehicle, sightseeing. As such, it is common for motor-home owners to tow a small vehicle on a trailer. However, the trailer can increase the difficulty of driving the motor home.

BRIEF SUMMARY

Embodiments described herein provide systems and methods for enabling reconfiguration of a cabin to maximize the internal living space within the cabin to accommodate, for example, a vehicle such as a small automobile.

In accordance with various embodiments of the invention there is provided a cabin used as part of a mobile home, caravan or other transport vehicle with an internal living space and a side wall adapted to fold out to form an alcove wherein the side wall includes an upper panel and a lower panel that are operatively coupled to the cabin such the wall is moveable between a stowed and deployed configuration to form the alcove.

In one embodiment there is provided a cabin adapted for carriage by a first vehicle including an interior living space that is reconfigurable to form an enlarged space inside the cabin. The interior living space may include furniture mounted on tracks, the furniture being slidable on the tracks between an expanded and a compacted configuration.

In some embodiments, the cabin includes a ramp pivotally coupled to the rear of the cabin and a winch system, the ramp being lowerable to allow a vehicle, such as a small automobile, to be winched up the ramp and into an enlarged space at the rear of cabin. The winch system may include two cables that can be independently tensioned so as to align the vehicle with the ramp and cabin.

According to some embodiments, a cabin of a transport vehicle may be described as including a cabin structure having an adjustable internal living space, the adjustable internal living space sized to accommodate an automobile when the cabin is in a transport configuration, and at least one bed movably coupled to a side wall of the structure to transition between a stowed configuration in which the bed is substantially vertical and a deployed configuration in which the bed is substantially horizontal. The cabin may also include furniture movably coupled to a floor of the cabin structure, the furniture movable from a front portion of the cabin structure when the cabin is in the transport configuration to a rear portion of the cabin structure when the cabin is in an in-use configuration. The furniture may be arranged on floor tracks, the floor tracks guiding the furniture between the front portion of the cabin structure and the rear portion of the cabin structure when the cabin transitions between the transport configuration and the in-use configuration.

The cabin may further include at least one expandable alcove configured to accommodate the bed and transition the bed between the stowed configuration and the deployed configuration. The expandable alcove may comprise a roof panel movably coupled to the cabin structure, a base panel movably coupled to the cabin structure, and a pair of articulated side panels coupled to the roof panel and the base panel, the articulated side panels positioned within a recess adjacent a side wall of the cabin structure when the bed is in the stowed configuration and positioned substantially vertically to form an outer wall of the expandable alcove when the bed is in the deployed configuration. The expandable alcove may further include a pair of side door panels rotatably coupled to the cabin structure on opposing sides of the expandable alcove, the side door panels configured to align substantially parallel to the roof panel and the base panel when the bed is in the stowed configuration to define the recess therebetween. Each side door panel may include a lock at each of an upper end and a lower end thereof to lock the side door panel to the roof panel and the base panel, respectively, when the bed is in the deployed configuration. The side door panels, base panel and roof panel can be configured to support the weight of an average adult when the bed is in the deployed configuration without supplementary braces or ground supports.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures associated with cabins of transport vehicles, such as, for example, cabins of mobile homes, may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
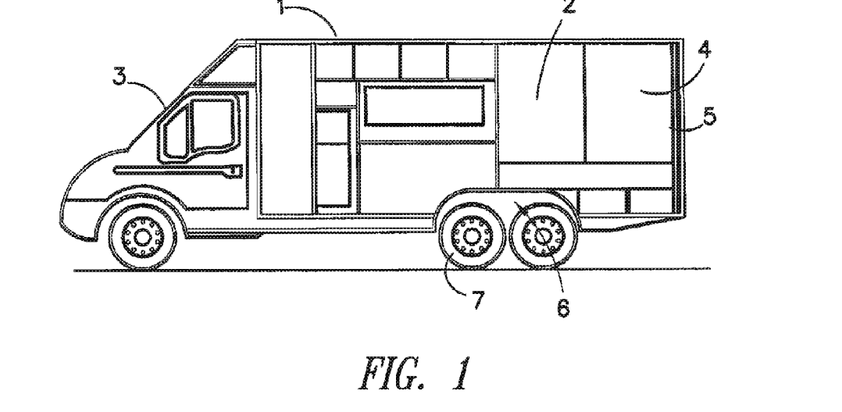
FIG. 1 is a side view of a cabin mounted to a transport vehicle.

Referring to FIG. 1, there is illustrated a cabin 1 with an internal living space 2 mounted on or integrated with a transport vehicle 3, which may be referred to as a mobile home. The living space 2 includes a vertical side wall 4 located toward a rear 5 portion of the cabin 1 which may be located partially over wheel arches 6 that partially surround the wheels 7 of the transport vehicle 3.

Figure 2:
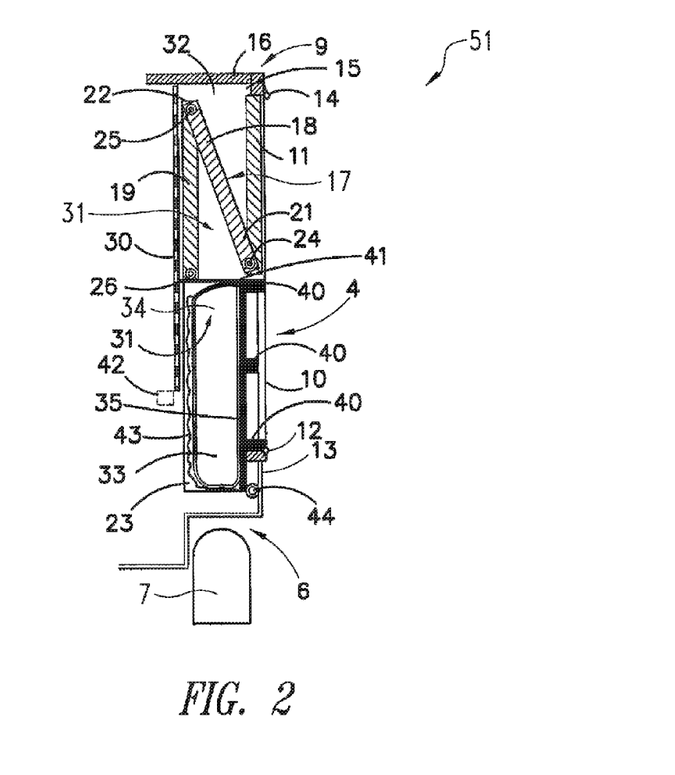
FIG. 2 is a side view of a side wall of the cabin of FIG. 1 with a bed illustrated in a stowed configuration.

Referring now to FIG. 2, the side wall 4 is shown in a stowed configuration 9. The side wall 4 can include a lower panel 10 and an upper panel 11. The lower panel 10 can be hinged by a pivot 12 located atop a vertical support section 13 located above the wheel arch 6 or another structural feature of the cabin 1. The upper panel 11 can be hinged by a pivot 14 located on the edge 15 of the roof 16 of the cabin 1.

In the illustrated embodiment, the lower panel 10 and upper panel 11 are joined by a linkage 17 that includes a first arm 18 and a second arm 19. The first arm 18 of the linkage 17 can be connected via a pivot connection 24 to the upper panel 11 at a first end 21 and can be connected via a pivot connection 25 to the second arm 19 at a second end 22 opposite the first end 21. To complete the linkage 17 between the lower panel 10 and the upper panel 11 the second arm 19 can be connected to side support 41 by pivot connection 26.

In the stowed configuration, folding doors 30 may be located adjacent the side wall 4. The folding doors 30 can be parallel in orientation and laterally spaced from the side wall 4 such that a recess 31 is formed between the side wall 4 and the doors 30. In the illustrated embodiment, an upper portion 32 of the recess 31 is shown housing the linkage 17. In the stowed configuration, the first arm 18 of the linkage 17 extends upward and diagonally across the upper portion 32 of the recess 31 from the first end 21 to the second end 22. The second arm 19 is shown stored in a substantially vertical orientation, adjacent and parallel to the folding door 30. The lower portion 33 of recess 31 may be used to house a bed 34.

The length of the bed 34 can be defined by end supports 23 located at each end of the bed 34, which form a bed head and a bed foot. The bed 34 can be supported by a bed support 35 that is mounted to the lower panel 10 by spacers 40. A side support 41 can skirt the side of the bed support 35 and provide a lower outer edge of a deployed alcove 51 (see FIG. 6) immediately beneath the second linkage 19 when in an alcove deployed configuration 50 (see FIG. 6). The bed support 35, can also act as a floor support for the alcove 51, defining the width of the bed 34. The bed can 34 be secured by a roller blind 43 that may be tensioned by a tensioning device 44.

Figure 3:
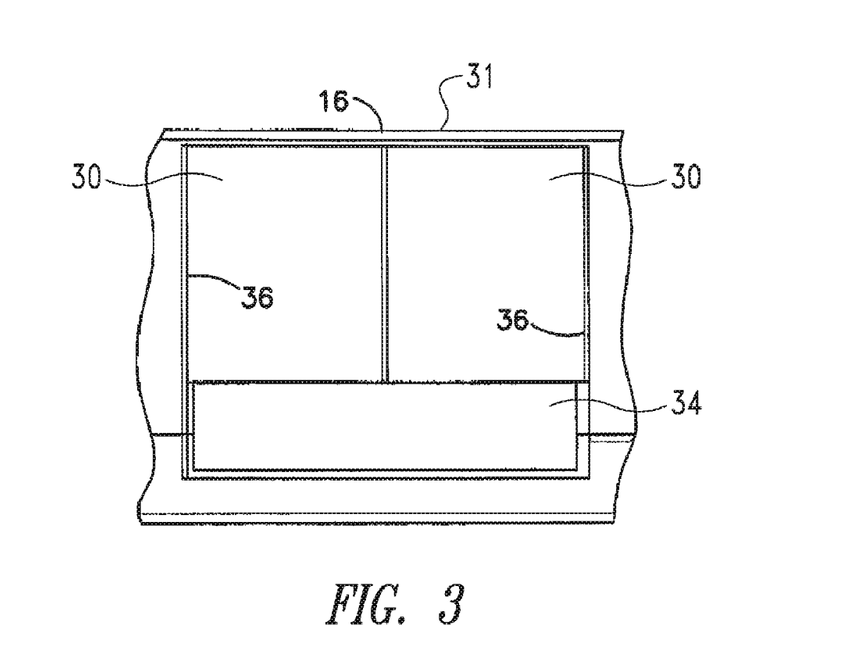
FIG. 3 is a front view of the side wall of FIG. 2 with folding doors in a closed position.

FIG. 3 shows a front view of the doors 30 from inside the cabin 1 of the illustrated embodiment. In this arrangement the doors 30 hide linkage mechanism 17 from view and at least partially hide the bed 34 from view. The doors 30 also retain the linkage 17 in the recess 31.

Figure 4:
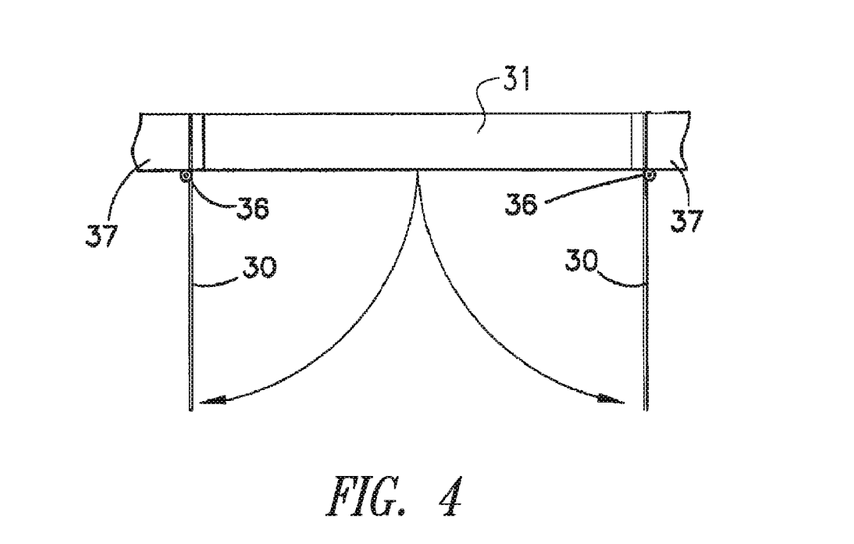
FIG. 4 is a top view of the side wall of FIG. 2 with folding door in an open position.

Referring now to FIG. 4, to enable one to fold out the bed 34 to a useable horizontal position, the folding doors 30 may be opened. The doors 30, which can be hinged via hinges 36 to an inner wall 37 of the cabin 1, may be opened inwardly thereby providing access to the recess 31 and providing clearance for the linkage 17 to move. A user is than able to move the bed 34 to an in-use or deployed position (see FIG. 6).

Figures 5, 6:
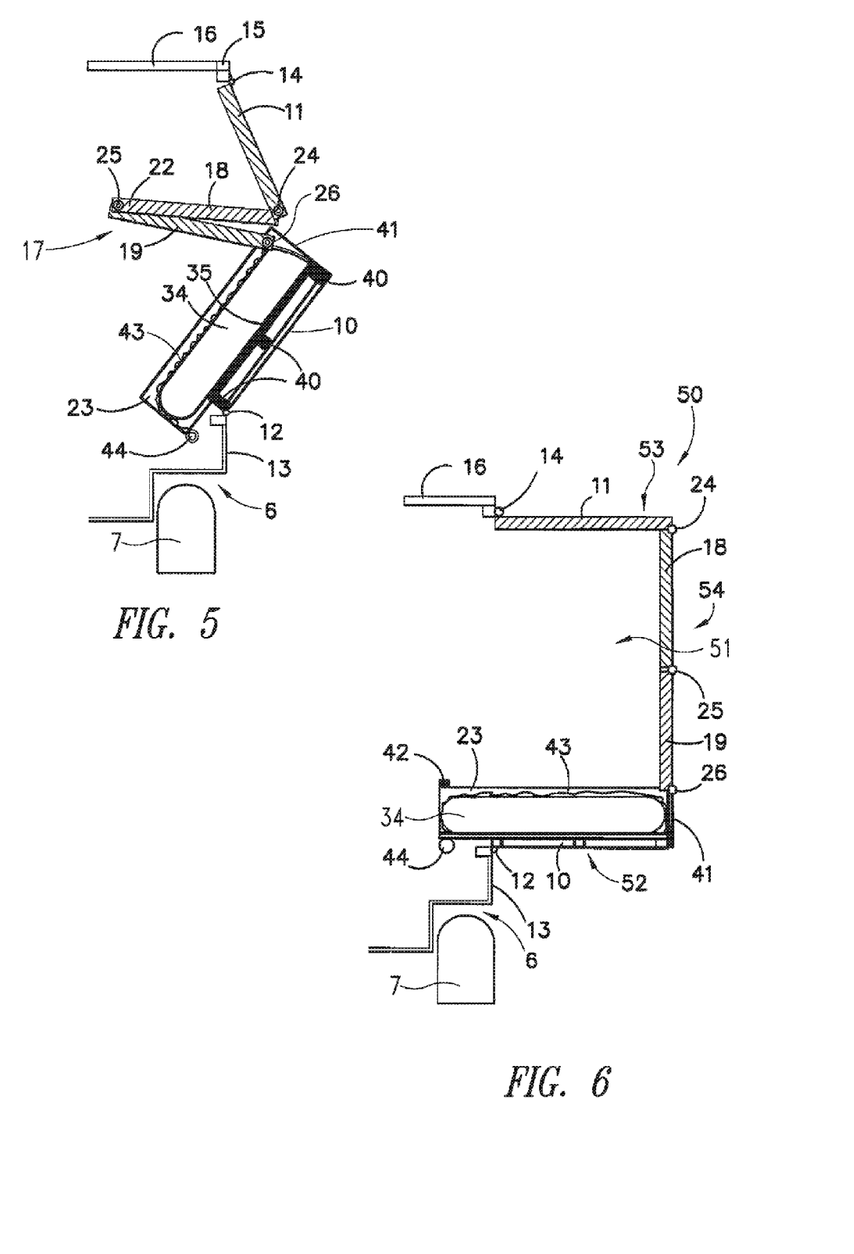
FIG. 5 is a side view of the side wall of FIG. 2 in an intermediate position between the stowed configuration and a deployed configuration.
FIG. 6 is a side view of the side wall of FIG. 2 in the deployed configuration to form an alcove.

According to the illustrated embodiment, and with reference to FIG. 5, during movement to a useable horizontal position the lower panel 10 is pivoted outwardly about the lower panel pivot 12, the outward movement pulling on linkage 17. To facilitate this motion, the pivotal connections (12, 14, 24, 25 and 26) operate together allowing lower panel 10 to pivot outwardly, lowering the bed 34 toward the in-use or deployed position (see FIG. 6) and allowing the upper panel 11 to pivot about pivot connection 14 toward a horizontal orientation. During this motion the first end 22 of the linkage, which defines the locality of the pivotal connection 25 between the first arm 18 and the second arm 19, firstly moves in an arc inwardly and downwardly relative to the side wall 4. As the lower panel 10 and the upper panel 11 are moved toward horizontal orientations, the pivot connection 12 and 24 tension the linkage 17. This tension causes the first arm 18 and second arm 19 to be withdrawn from the recess 31 and straighten to a deployed configuration, forming an new vertical outer wall 54, and defining an alcove 51 as shown in FIG. 6. Stops 42 may be provided that engage with the outer edge of the end supports 23 to restrain the lower panel 10 from rotating past the horizontal position. The doors 30 can then be folded out to secure the upper panel 11 and lower panel 10 into position.

Referring to FIG. 6, the lower panel 10 and upper panel 11 can be in a substantially horizontal orientation in the deployed configuration, thereby defining a base 52 and a roof 53 of the alcove 51. The first arm 18 and second arm 19 can be in a substantially vertical orientation forming the outer wall 54 of the alcove 51. The space provided by the alcove 51 increases the internal living space 2 of the cabin 1 and provides for an area for the bed 34 to be oriented in a useable position. To access the bed 34, the blind 43 can then be removed from the bed 34, rolling up into the tensioning device 44.

Figure 7:
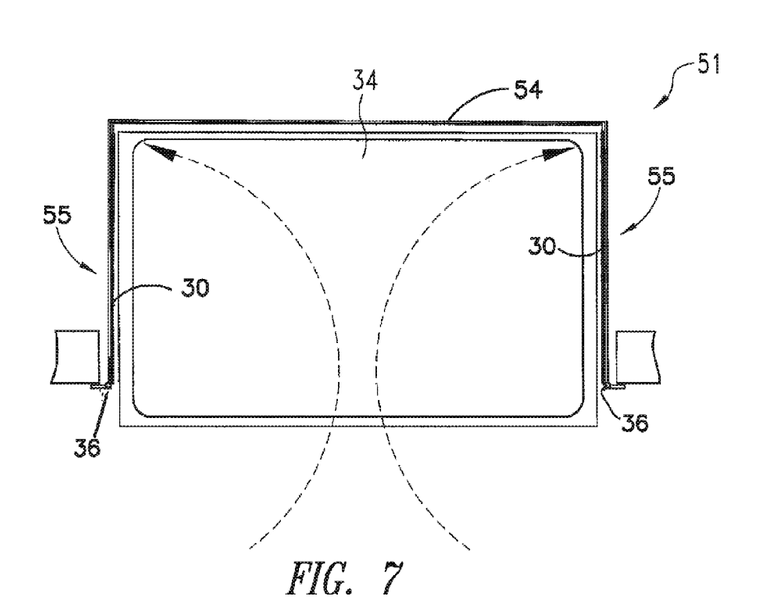
FIG. 7 is a top view of the alcove of FIG. 6.

Referring to FIG. 7, the doors 30 can be pivoted towards the interior of the alcove 51 from the position shown in FIG. 4 to the position shown in FIG. 7 to thereby form a side panel 55 of the alcove 51. In this manner, the side panel 55 may also provide support of the roof 53 of the alcove 51. To achieve rotation of the doors 30 in this manner, the folding doors 30 may be sized to provide clearance as they are pivoted over the surface of the bed 34.

Figure 8:
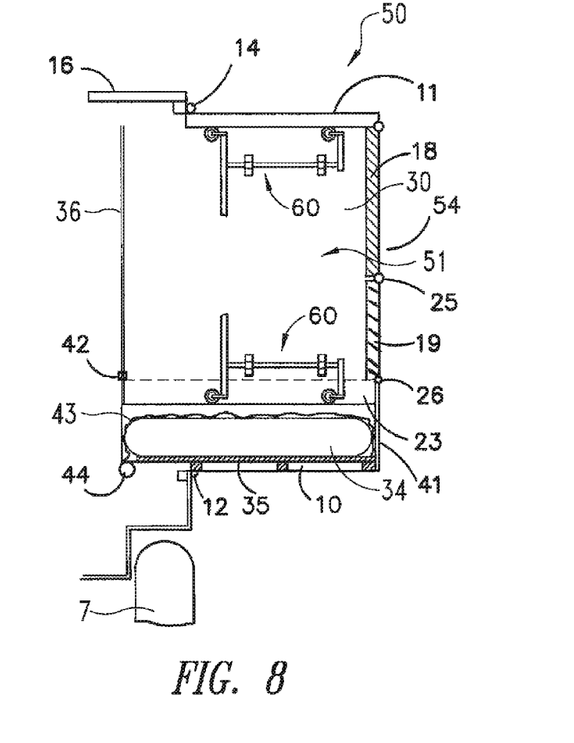
FIG. 8 is a side view of the alcove of FIG. 6 further illustrating locking mechanisms.

Referring to FIG. 8, the doors 30 can be secured to the roof 53 and the base 52 of the alcove 51 using locking mechanisms 60. In such an arrangement, each of the doors 30 may abut a respective end support 23 and the top panel 11 enclosing the alcove 51 from the elements, for example, wind or rain. The illustrated embodiment of the locking mechanisms 60 are further described with reference to FIG. 9a and FIG. 9b, below.

Figure 9A:
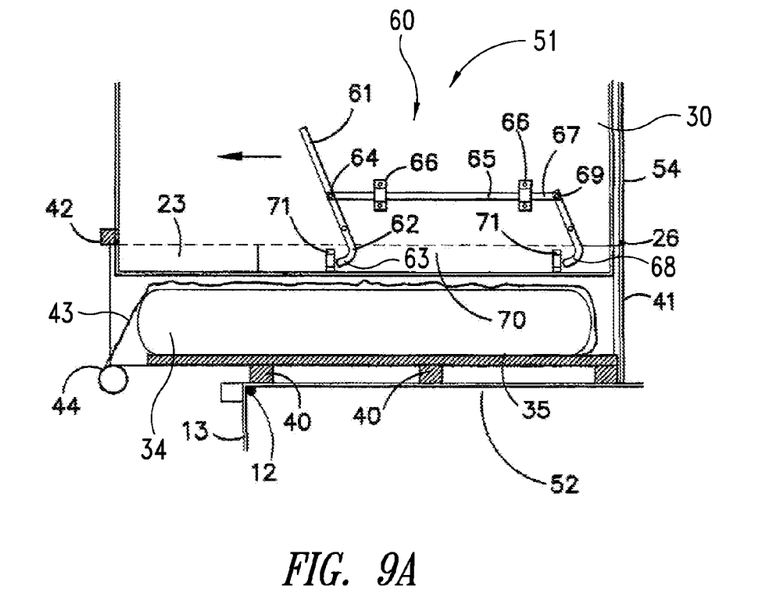
FIG. 9a is a partial side view of the alcove of FIG. 8 showing one of the locking mechanisms in an unlocked position.
Figure 9B:
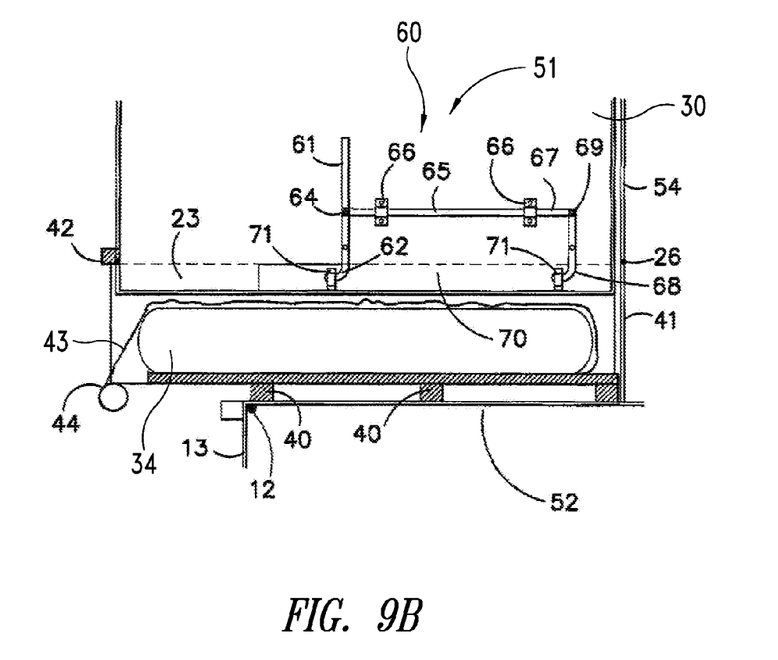
FIG. 9b is a partial side view of the alcove of FIG. 8 showing one of the locking mechanisms in a locked position.

FIG. 9a illustrates a locking mechanism 60 at a lower portion of the alcove 51. The locking mechanism 60 is shown including an actuating handle 61 with a hook 62 at one end 63 and a pivot 64 that couples to a linkage 65 located intermediate the hook 62 and the handle 61. The linkage 65 is horizontal in orientation and is held in place by two spaced guides 66 affixed to the doors 30. The end of the linkage 67 away from the handle 61, includes another hook 68 coupled to the linkage via a pivot 69. The side 70 of the bed base 35 includes eyes 71. To lock the doors 30 to the bed base 35 the handle 61 is actuated, as illustrated in FIG. 9b, to engage hooks 62 and 68 with eyes 71. A similar locking mechanism 60 can be provided to lock the doors 30 to the roof 53 of the alcove 51.

Figure 10:
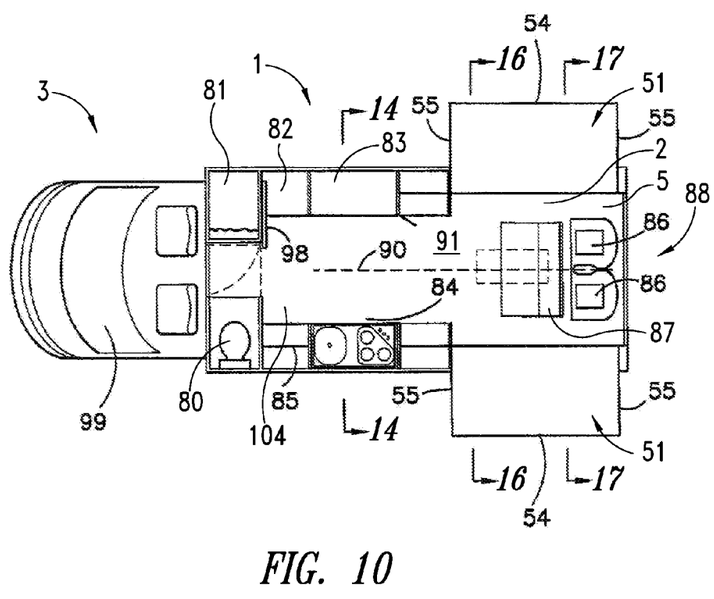
FIG. 10 is a top schematic view of the cabin and transport vehicle of FIG. 1 with alcoves deployed on both sides of the cabin.

FIG. 10 illustrates a schematic plan view of the cabin 1 and transport vehicle 3 according to one embodiment. An alcove 51 is shown in the deployed configuration 50 on both sides of the rear portion 5 of the cabin 1. The internal living space 2 is skirted by facilities such as a toilet 80, shower 81, refrigerator 82, bench 83, kitchen 84 and access door 85. A front portion 104 of the cabin also includes a sliding door 98 configured to allow access between a drive cab 99 of the transport vehicle 3 and the cabin 1. The living space 2 can also include movable furniture 88, such as a chair 86 and table 87, that are movably coupled to a floor 91 of the cabin 1. For example, furniture 88 may be coupled to a track 90 integrated into the floor 91 of the internal living space 2 of the cabin. The track 90 can be configured to run along an elongate axis extending between the rear portion 5 and front portion 104 of the cabin 1.

Figure 11:
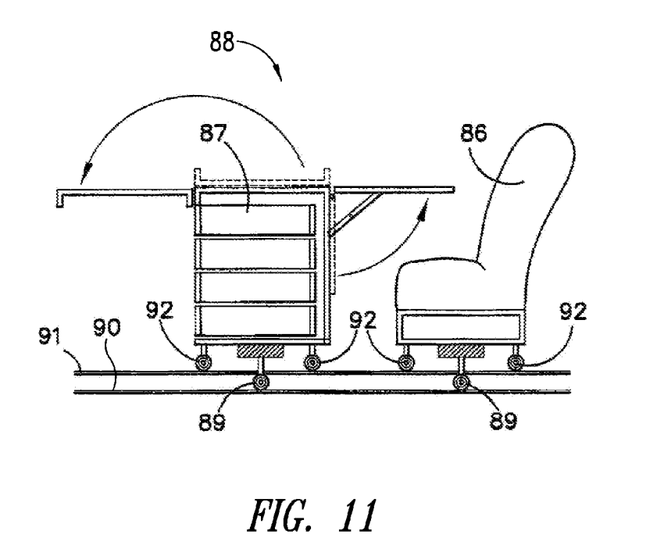
FIG. 11 is a side view of furniture mounted to tracks within a floor of the cabin of FIG. 1.

FIG. 11 shows the chair 86 and the table 87 coupled to tracks 90 with a bogey wheel 89 type arrangement. Additionally, a base of the chair 86 and the table 87 is provided with castor wheels 92 spaced apart from the bogey wheel 89 to provide a stable base. These wheels 89, 92 allow the chair 86 and table 87 to be easily slidable along the tracks 90. The configuration of the castor wheels 92, bogey wheels 89 and the track 90 may allow the furniture 88 to pivot at least 90 degrees.

Figure 12:
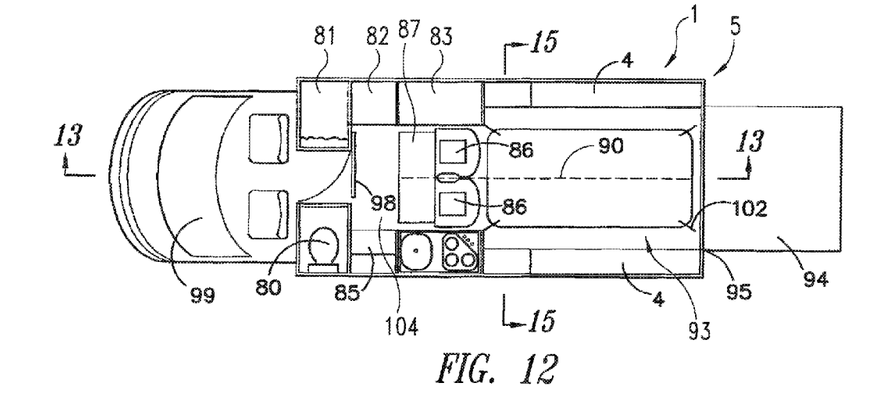
FIG. 12 is a top schematic view of the cabin and transport vehicle of FIG. 1 with side walls in the stowed configuration and the furniture moved forward in the cabin.

To change the configuration of the internal living space 2, the furniture 88 may be slid along the tracks 90 towards the front 104 of the cabin 1 to provide for additional space near the beds 34, as is shown in FIG. 12. As illustrated in FIG. 12, the furniture 88 is shown located at the front portion 104 of the cabin 1. This provides an enlarged space 93 toward the rear 5 of the cabin 1. The cabin 1 can also include a ramp 94 coupled via a hinge 95 to the rear 5 of the cabin 1.

Figure 13:
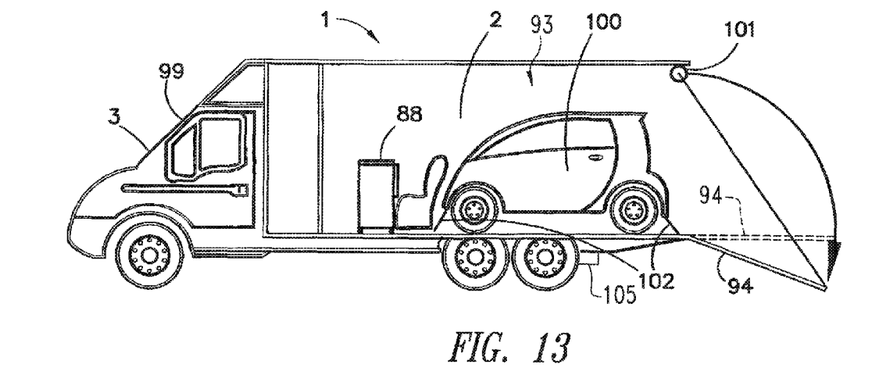
FIG. 13 is a side schematic view of the cabin and transport vehicle of FIG. 1 taken along line 13-13 in FIG. 12 showing the furniture moved forward in the cabin and a small vehicle parked in a rear portion of the cabin.

FIG. 13 shows a side view of the ramp 94. The ramp 94 can be raised and lowered with a door raising mechanism 101. The mechanism 101 may position the ramp 94 such that a small vehicle 100, such as a small automobile, can be moved up the ramp 94 and positioned inside the enlarged space 93. The small vehicle 100 may be held in place, behind the furniture 88 for example, by tie-downs 102. The ramp 94 can be fixed in a horizontal configuration to form an outdoor deck to supplement the internal living space 2 when the cabin 1 is in an in-use configuration.

Winches 103 can be supplied to pull the vehicle 100 into the enlarged space 93 since there may often be insufficient space to exit the small vehicle 100 should it be driven into the enlarged space 93. The cabin 1 and transport vehicle 3 may also include an adjustable suspension system 105 that is configured to selectively raise and lower the rear 5 of the cabin 1. In this manner, the rear 5 of the cabin 1 can be lowered to expel the vehicle out of the internal living space 2 at least partially under the force of gravity. Tension in the cables (not shown) of the winches 103 can be used to control a rate at which the vehicle 100 is pulled into and let out of the enlarged space 93.

Figure 14:
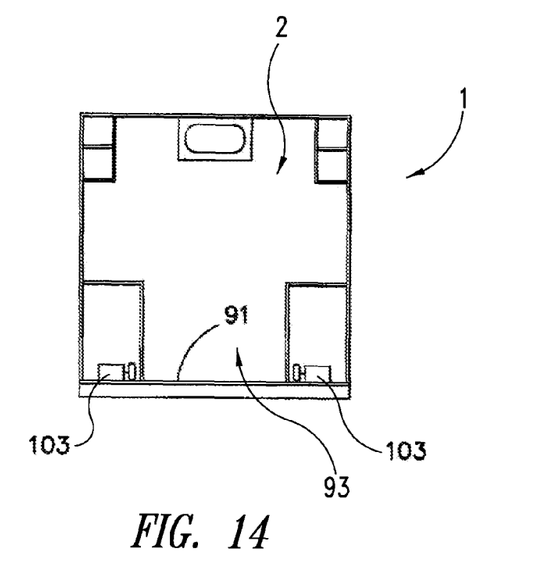
FIG. 14 is a cross-sectional view of the cabin of FIG. 1, along line 14-14 shown in FIG. 10.

FIG. 14 illustrates a cross section of the cabin 1 and shows the possible location of two winches 103 spaced apart on opposite sides of the cabin 1 according to one embodiment. These winches 103 can be used to pull the small vehicle 100 up the ramp 94 and into the enlarged space 93. The winches 103 may provide differential tension to the cable (not shown) to pull the small vehicle 100. The differential tension may be controllable by a user using a joystick (not shown) to provide the ability to steer or guide the small vehicle 100 up the ramp 94 and into the enlarged space 93 remotely.

Figure 15:
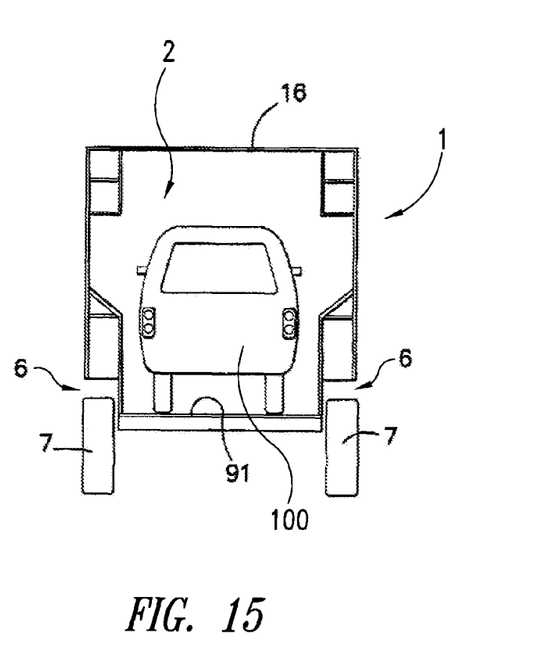
FIG. 15 is a cross-sectional view of the cabin and transport vehicle of FIG. 1, along line 15-15 shown in FIG. 12.
Figure 16:
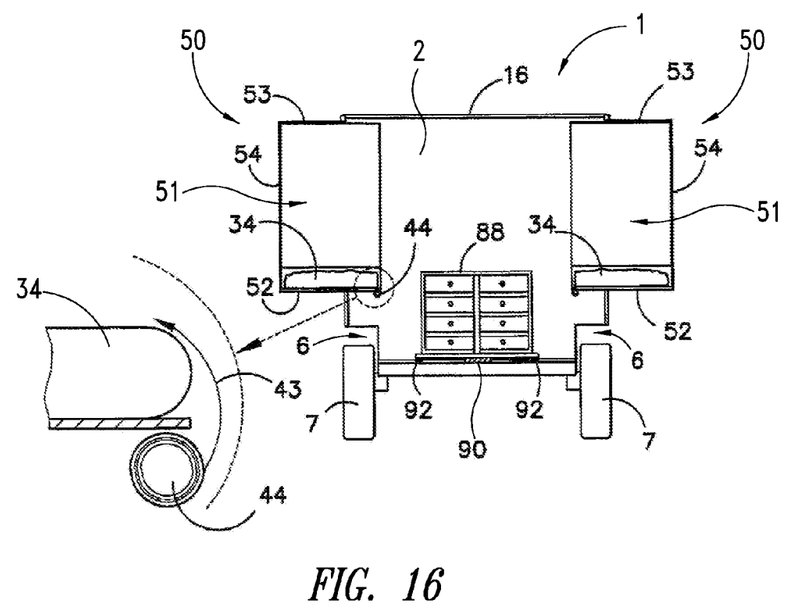
FIG. 16 is a cross-sectional view of the cabin and transport vehicle of FIG. 1, along line 16-16 shown in FIG. 10.
Figure 17:
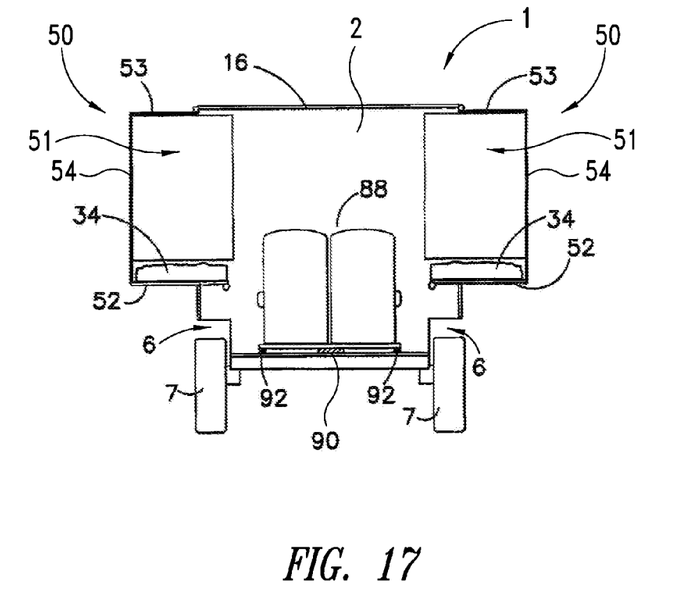
FIG. 17 is a cross-sectional view of the cabin and transport vehicle of FIG. 1, along line 17-17 shown in FIG. 10.

FIG. 15 illustrates the small vehicle 100 in the form of a small automobile inside the living space 2 of the cabin 1. FIG. 16 illustrates two opposing alcoves 51 of the cabin 1 each in a deployed configuration 50. A detailed view shows a roller blind 43 that may be used to cover the bed 34 during transport. The blind 43 may be stowed into the tensioning device 44 when the bed 34 is in the in-use position. FIG. 17 illustrates the arrangement of the track 90 that can be used to guide bogey wheels 89 of the furniture 88.

It will be appreciated that configurations of the internal living space 2 of the cabin 1 described herein avoid some of the compromises often found in cabins associated with know motor homes where a bed takes up a major part of the floor space or is located over the drive cabin which presents a particular problem for older people with reduced dexterity or who need to visit the bathroom during the night.

Also, the toilet and shower in many conventional motor homes are very confined and the kitchen bench space limited. The configurations presented herein may provide, according to some embodiments, a larger than normal shower 81 and toilet 80 that may be located immediately behind the driver cab 99 and easily accessed via the drive cab 99 for roadside stops. In some embodiments, the arrangement of the access door 85 and the sliding door 98 allow for the cab 99 to be closed off when camping with the access door 85 allowing access to and from the cabin 1. Alternatively, with both doors open access can be achieved into part of the kitchen even with the small vehicle 100 on board. It will also be appreciated that because the bed 34 opens outwardly of the internal living space 2 and moveable furniture 88 can be reconfigured on tracks 90 within the internal living space 2, greater internal floor and bench space is able to be achieved.

The invention has been described by way of non-limiting example only and many modifications and variations may be made thereto without departing from the spirit and scope of the invention described. For example, the various embodiments described above can be combined to provide further embodiments.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cabin of a transport vehicle, the cabin comprising:
   a cabin structure having an adjustable internal living space;
   at least one bed movably coupled to a side wall of the structure to transition between a stowed configuration in which the bed is substantially vertical and a deployed configuration in which the bed is substantially horizontal; and
   at least one expandable alcove configured to accommodate the bed and transition the bed between the stowed configuration and the deployed configuration, the expandable alcove including a roof panel movably coupled to the cabin structure, a base panel movably coupled to the cabin structure and a pair of articulated side panels coupled to the roof panel and the base panel which collectively define an exterior wall of the alcove when the bed is in the deployed configuration, and wherein the roof panel and the base panel collectively define an exterior wall of the transport vehicle when the bed is in the stowed configuration.

2. The cabin of claim 1, further comprising:
   furniture movably attached to a floor of the cabin structure, the furniture movable from a front portion of the cabin structure when the cabin is in a transport configuration to a rear portion of the cabin structure when the cabin is in an in-use configuration.

3. The cabin of claim 2 wherein the furniture is arranged on floor tracks, the floor tracks guiding the furniture between the front portion of the cabin structure and the rear portion of the cabin structure when the cabin transitions between the transport configuration and the in-use configuration.

4. The cabin of claim 1 wherein the expandable alcove further includes a pair of side door panels rotatably coupled to the cabin structure on opposing sides of the expandable alcove, the side door panels configured to align substantially parallel to and offset from the roof panel and the base panel when the bed is in the stowed configuration to define a recess therebetween to accommodate the bed and the pair of articulated side panels with the pair of articulated side panels positioned above the bed.

5. The cabin of claim 4 wherein each side door panel includes a lock at each of an upper end and a lower end thereof to lock the side door panel to the roof panel and the base panel, respectively, when the bed is in the deployed configuration.

6. The cabin of claim 5 wherein the side door panels, base panel and roof panel are configured to support the weight of an average adult when the bed is in the deployed configuration without supplementary braces or ground supports.

7. The cabin of claim 1, further comprising:
   a ramp pivotably coupled to a rear portion of the cabin structure; and
   a pair of independently controlled winches positioned at opposing sides of the internal living space that are configured to pull and maneuver an unoccupied automobile up the ramp and into the internal living space.

8. The cabin of claim 7 wherein a cable of each winch is configured to be independently tensioned to facilitate alignment of the automobile with the ramp and cabin structure.

9. The cabin of claim 7 wherein the ramp is configured to be fixed in a horizontal configuration to form an outdoor deck to supplement the internal living space when the cabin is in an in-use configuration.

10. The cabin of claim 7, further comprising:
    an adjustable suspension system, the suspension system configured to selectively lower the rear portion of the cabin structure to expel the automobile out of the internal living space at least partially under the force of gravity.

11. An expandable alcove of a cabin configurable between a stowed configuration and a deployed configuration, the alcove comprising:
    a roof panel movably coupled to the cabin;
    a base panel movably coupled to the cabin, the roof panel and the base panel aligned end-to-end to collectively define an exterior wall of the cabin when the alcove is in the stowed configuration;
    a pair of articulated side panels movably coupled to the roof panel and the base panel, the articulated side panels positioned within a recess adjacent a side wall of the cabin when the alcove is in the stowed configuration and positioned substantially vertically end-to-end to collectively form an outer wall of the alcove when the alcove is in the deployed configuration; and
    a pair of side door panels rotatably coupled to the cabin on opposing sides of the alcove, the side door panels configured to align substantially parallel to and offset from the roof panel and the base panel when the alcove is in the stowed configuration to define the recess.

12. The expandable alcove of claim 11 wherein each side door panel includes a lock at each of an upper end and a lower end thereof to lock the side door panel to the roof panel and the base panel, respectively, when the alcove is in the deployed configuration.

13. The expandable alcove of claim 11 wherein the side door panels, base panel and roof panel are configured to support the weight of an average adult when the alcove is in the deployed configuration without supplementary braces or ground supports.

14. The expandable alcove of claim 11 wherein the side door panels are configured to align side-by-side to conceal the pair of articulated side panels within the recess when the alcove is in the stowed configuration.

\* \* \* \* \*